(12) United States Patent
Squires et al.

(10) Patent No.: US 10,338,376 B2
(45) Date of Patent: Jul. 2, 2019

(54) IMAGE STABILIZATION AND PIXEL SHIFTING FOR A NANOSATELLITE IMAGING SYSTEM

(71) Applicant: Hera Systems, Inc., San Jose, CA (US)

(72) Inventors: David D. Squires, Stockton, CA (US); Peter Mrdjen, Aptos, CA (US); Brij Agrawal, Monterey, CA (US); Matthew Sorgenfrei, San Francisco, CA (US); Jeffrey Wedmore, San Jose, CA (US); Robert Machinski, Campbell, CA (US)

(73) Assignee: Hera Systems, Inc., San Jose, CA (US)

( * ) Notice: Subject to any disclaimer, the term of this patent is extended or adjusted under 35 U.S.C. 154(b) by 0 days.

(21) Appl. No.: 15/413,413

(22) Filed: Jan. 23, 2017

(65) Prior Publication Data

US 2017/0329126 A1     Nov. 16, 2017

Related U.S. Application Data

(60) Provisional application No. 62/286,229, filed on Jan. 22, 2016.

(51) Int. Cl.
| | | |
|---|---|---|
| *G02B 26/08* | (2006.01) | |
| *G02B 6/35* | (2006.01) | |
| *G02B 5/09* | (2006.01) | |
| *G02B 7/183* | (2006.01) | |
| *G02B 6/42* | (2006.01) | |
| *G02B 23/00* | (2006.01) | |
| *G02B 27/64* | (2006.01) | |

(52) U.S. Cl.
CPC ........... *G02B 26/0816* (2013.01); *G02B 5/09* (2013.01); *G02B 6/352* (2013.01); *G02B 6/4262* (2013.01); *G02B 6/4266* (2013.01); *G02B 7/183* (2013.01); *G02B 23/00* (2013.01); *G02B 26/0833* (2013.01); *G02B 27/64* (2013.01)

(58) Field of Classification Search
None
See application file for complete search history.

(56) References Cited

U.S. PATENT DOCUMENTS

| | | |
|---|---|---|
| 2002/0041328 A1 | 4/2002 | LeCompte et al. |
| 2004/0119020 A1 | 6/2004 | Bodkin |
| 2009/0015891 A1 | 1/2009 | Kane |
| 2010/0053609 A1 | 3/2010 | Chrisp |
| 2011/0193814 A1 | 8/2011 | Gay et al. |
| 2011/0292505 A1 | 12/2011 | Kurtz et al. |
| 2013/0155218 A1 | 6/2013 | Kalkbrenner et al. |
| 2013/0223832 A1 | 8/2013 | Miesak |

(Continued)

OTHER PUBLICATIONS

International Search Report and Written Opinion dated May 26, 2017, International Patent Application No. PCT/US2017/014636, filed Jan. 23, 2017.

*Primary Examiner* — Jennifer D. Carruth

(74) *Attorney, Agent, or Firm* — Davis Wright Tremaine LLP; Philip H. Albert

(57) ABSTRACT

A satellite imaging system includes a camera with a pixel shifting mechanism, thermally stable imaging payload, and high-stability attitude determination and control system (ADCS) to improve image resolution. To address the overall stabilization requirement, the satellite incorporates a number of design elements that, in combination, provide the stable result required for good imaging.

17 Claims, 13 Drawing Sheets

(56) References Cited

U.S. PATENT DOCUMENTS

2014/0195150 A1     7/2014   Rios
2015/0326769 A1*   11/2015   Richarte .............. G01C 11/025
                                                                            348/169

* cited by examiner

| Band | Wavelength |
|---|---|
| Coastal Blue | 400-450 nm |
| Blue | 450-510 nm |
| Green | 510-580 nm |
| Yellow | 585-625 nm |
| Red | 630-690 nm |
| Red Edge | 705-745 nm |
| NIR-1 | 770-895 nm |
| NIR-2 | 860-1040 nm |

FIG. 12

Camera 1

| R | Y | R | Y |
|---|---|---|---|
| G | B | G | B |
| R | Y | R | Y |
| G | B | G | B |

Camera 2

| CB | RE | CB | RE |
|---|---|---|---|
| N1 | N2 | N1 | N2 |
| CB | RE | CB | RE |
| N1 | N2 | N1 | N2 |

FIG. 13

IMAGE STABILIZATION AND PIXEL SHIFTING FOR A NANOSATELLITE IMAGING SYSTEM

CROSS-REFERENCES TO PRIORITY AND RELATED APPLICATIONS

This application claims priority from and is a non-provisional of U.S. Provisional Patent Application No. 62/286,229 filed Jan. 22, 2016 entitled "Image Stabilization and Pixel Shifting for a Nanosatellite Imaging System."

Related applications include:

U.S. Provisional Patent Application No. 62/286,234 filed Jan. 22, 2016 entitled "Imaging System with an Optical Path and Telescope Shape Optimized for Nanosatellites" naming Squires et al. ("Squires I").

U.S. Provisional Patent Application No. 62/286,225 filed Jan. 22, 2016 entitled "Multi-Camera Imaging System for Nanosatellites" naming Mrdjen et al. ("Mrdjen").

FIELD OF THE INVENTION

The present disclosure generally relates to satellite-based imaging systems and more generally to nanosatellites that are orbiting vehicles, airborne payloads, or other imaging systems with highly constrained size requirements.

U.S. patent application Ser. No. 15/413,409 filed Jan. 23, 2017 entitled "Multi-Camera Imaging System for Nanosatellites." [Filed of even date with the present application;]

U.S. patent application Ser. No. 15/413,406 filed Jan. 23, 2017 entitled "Imaging System with an Optical Path and Telescope Shape Optimized for Nanosatellites." [Filed of even date with the present application;]

The entire disclosure(s) of application(s)/patent(s) recited above is(are) hereby incorporated by reference, as if set forth in full in this document, for all purposes.

All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BACKGROUND

The costs to launch a rocket into Earth orbit can run into the millions of dollars. As a rocket can carry multiple satellites and other equipment, the cost of the launch can be allocated among the different payloads. Consequently, smaller satellites might incur smaller costs to get into orbit. The measure of a size of a satellite could relate to its mass, its volume, its height, width and depth, as well as its shape. As for shape, it might be that the cost of getting equipment onto a launch bay is a function of the envelope of the satellite.

In view of these considerations, nanosatellites are often deployed, especially where the desired functionality fits in a nanosatellite form factor and where a constellation of satellites are needed. The term "nanosatellite" often refers to an artificial satellite with a wet mass between 1 and 10 kg, but it should be understood that features might be present in satellites outside that range. A constellation of smaller satellites might be more useful than one large satellite for the same or similar construction and launch budget. However, the result is usually that a rocket payload comprises many more independent vehicles.

Typically these satellites include propulsion, solar panels for on-board electrical power generation, power management systems, thermal control systems, attitude controls systems, computer processors, storage, and communications capabilities. Some satellites are used for imaging and might include a telescope assembly for light gathering and a camera assembly for converting gathered light into electronic data, which can then be processed on-board and/or communicated to another satellite or a ground station.

Resolution and other factors can limit the usefulness and clarity of images taken from a satellite.

Consequently, there are a number of areas in which satellite imaging systems can benefit from improvement.

SUMMARY

A satellite imaging system used in a satellite has a telescope section arranged to receive incoming light, a camera having a sensor array that shifts relative to an optical axis to the camera while capturing an image to improve the resolution thereof, and an attitude determination and control system, where the satellite stabilizes the satellite while capturing an image.

The satellite imaging system might include an active disturbance cancellation system, where a combination of mechanisms, sensors, and computer algorithms reduce the effect of disturbances while capturing an image, and a high-rate data readout and recording system, where multiple images can be collected within a shortened time period to limit the effect of vibration upon image quality. The satellite imaging system may also include image stabilization and pixel shifting for a nanosatellite imaging system.

Various aspects, advantages, features and embodiments are included in the following description of exemplary examples thereof, which description should be taken in conjunction with the accompanying drawings. The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 10($b$) is a straight-on side view of an optical barrel section.

FIG. 12 is a chart of spectral bands.

FIG. 13 illustrates examples of color filters used on pixel arrays.

DETAILED DESCRIPTION

Figure 1:
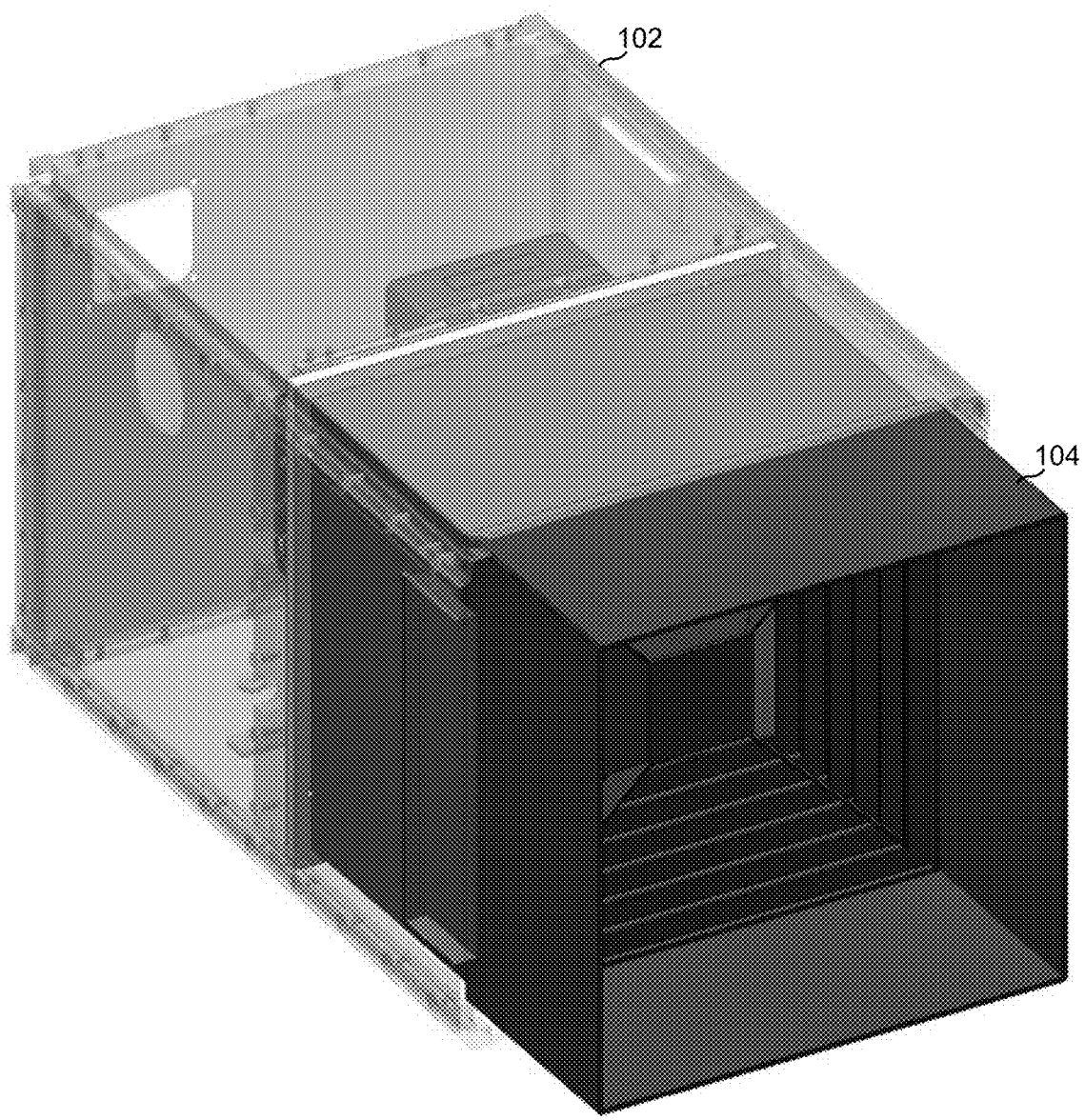
FIG. 1 is a front isometric view of an imaging nanosatellite.
Figure 2:
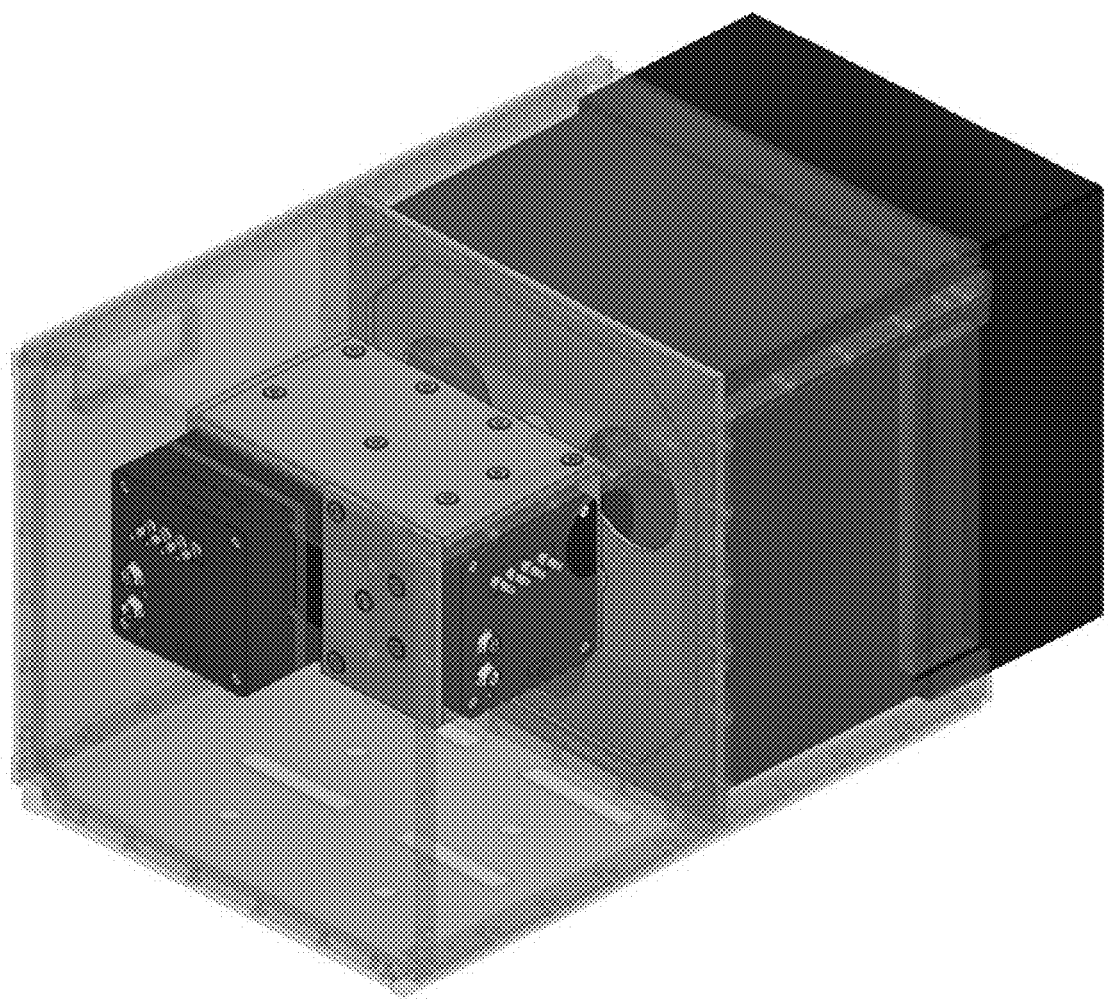
FIG. 2 is a rear isometric view of an imaging nanosatellite.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include an imaging satellite with an example satellite imaging system having a camera, a pixel shifting mechanism, thermally stable imaging payload, and high-stability attitude determination and control system (ADCS) to improve image resolution. To address the overall stabilization requirement, the satellite incorporates a number of design elements which, in combination, provide the stable result required for good imaging.

The resolution of a satellite imaging system is dependent upon the amount of light that the system's telescope is able to gather, the diffraction limited resolution that the optical design is able to provide, the sensitivity and pixel arrangement of the sensor, and the stability of the imaging system (i.e. the relative motion between the platform and target). For a digital camera, the resolution of the camera depends on the density and arrangement of the individual pixel sensors on the sensor array (typically known as the pitch, or distance, between pixels). Pixel pitch establishes what is known as the spatial sampling rate of the sensor. The individual pixel sensors, such as a charge coupled device (CCD) or a complementary metal-oxide semiconductor (CMOS) type sensor, can only be packed with a certain density into a square two-dimensional array without obstructing one another. If the pixels of the array are to have elements that are sensitive in more than one wavelength band, this will further decrease the resolution within each band.

For example, for a sensor array using an RGB colorspace for the visual spectrum, the array will need to accommodate sensors for each of the red, green, and blue color ranges (such as in a Bayer filter mosaic), which will reduce (worsen) the resolution of the green range by half and the red and blue ranges by a factor of four relative to the maximum un-aliased diffraction-limited and sensor sampling rate limited resolution. If additional wavelength ranges are to be sensed with the same filter array, such as into the near infra-red or the near ultra-violet, this will further reduce the resolution of the individual wavelength ranges. Although an additional camera adds weight to the satellite, the additional filter array that comes with it is very beneficial for optimizing the use of light energy (radiometric performance), wavelengths (spectral resolution) and retention of spatial (sampling) resolution. The added weight and volume are manageable in the described satellite system.

The satellite imaging system described here balances mass, volume, and imaging performance by using multiple cameras having sensor arrays sensitive to different wavelength ranges, in order to improve sampling resolution, but where the individual cameras can each be sensitive to more than one wavelength range, in order to save on the mass of the satellite. For example, the incoming image can be exposed to at least two cameras, with each of the cameras getting a distinct set of one or more wavelength band that can be captured simultaneously. One of the cameras is pixel-shifted in two axes to increase collected information and reduce imaging artifacts giving an apparent spatial and spectral resolution improvement. The images of the selected wavelength ranges from each of the cameras are then aligned and combined to form a remerged image having color components from more than one of the cameras. Depending on the embodiment, the selection and combination of wavelength ranges from the different cameras can be done on satellite, done terrestrially, or some combination of these.

The incoming image can be split using a double-dichroic beam splitter, as discussed further below. In one embodiment, there are two cameras with the first camera receiving the visible light wavelengths, while the second camera gets the red edge, Near Infrared 1 (N1) and Near Infrared 2 (N2) bands, and possibly also wavelengths below the range of standard visible wavelength sensors, such as Coastal Blue (CB). Use of one camera for the visible range can have the advantages that data from the visible range is commonly wanted in applications and that such sensors are more readily available. This also allows for use of differing resolution levels, if desired, where the visible image can have a higher resolution that can be overlaid with data from selected ones of the additional wavelengths that are of interest for a particular application.

FIG. 1 is a front isometric view for an example of an imaging nanosatellite. The satellite is a rectangular box shape, with a square cross-section, that allows a number of such satellites to be stacked compactly as the payload of a launch vehicle. The square telescope provides for optimal use of the satellite cross-section, thereby allowing an increase in aperture area and a diagonal aperture dimension beyond what a circular aperture would provide within the same cross-section. This provides a correspondingly increased light collecting ability and a larger effective aperture dimension on the diagonal of the mirror. The satellite 102 is shown with a deployable fore-baffle 104 extended to aid with stray light control, but which can be retracted to keep the satellite compact. At the rear is the camera system, which is partially visible in the view of FIG. 1.

Figure 3:
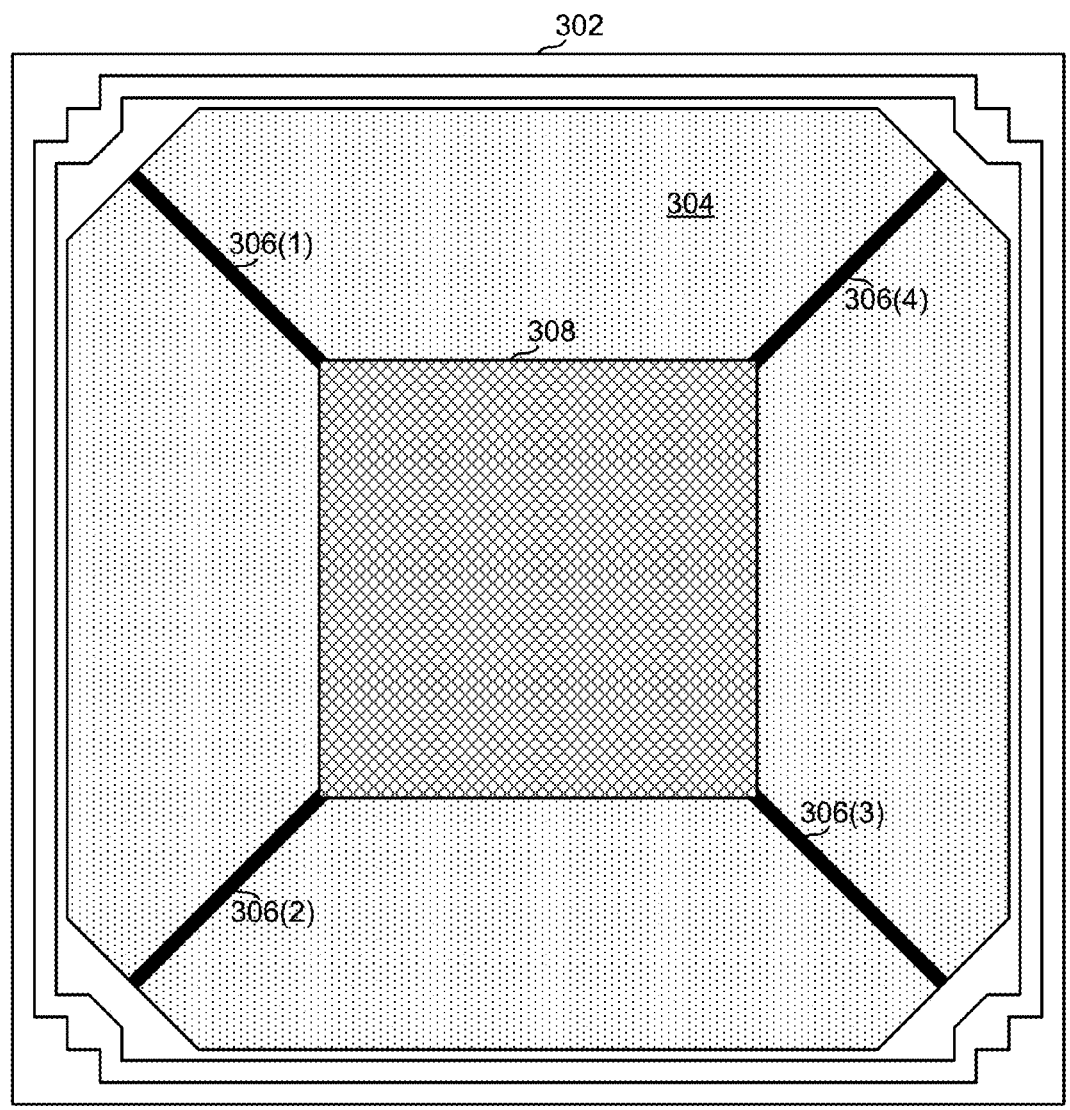
FIG. 3 is a front planar view of a telescope section of an imaging nanosatellite.

FIG. 3 is a front planar view of a telescope section of an imaging system of a satellite 302. FIG. 3 shows a primary reflector 304, a secondary reflector 308 and struts 306(1)-(4) for supporting secondary reflector 308.

Figure 4:
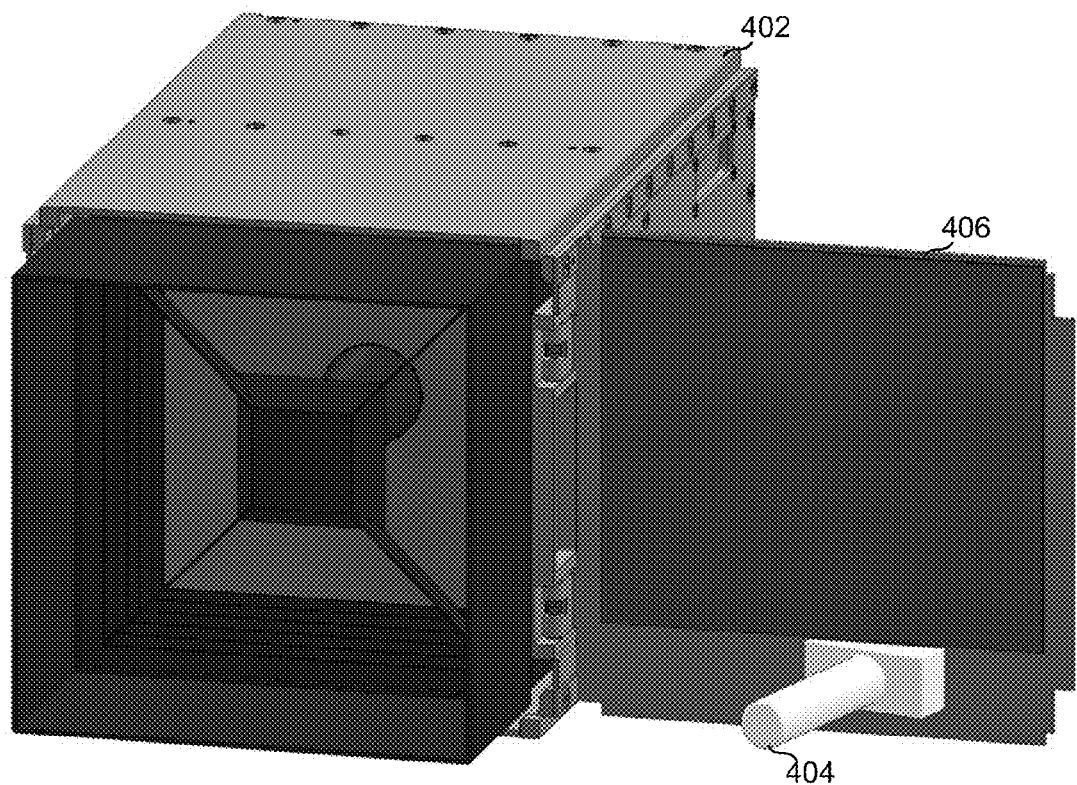
FIG. 4 is an isometric view of an imaging nanosatellite in a deployed mode with communications antennas deployed.

FIG. 4 is an isometric view of an imaging nanosatellite 402 in a deployed mode with communications antennas deployed. In this example, there is a planar antenna 406 and another antenna 404.

Figure 5:
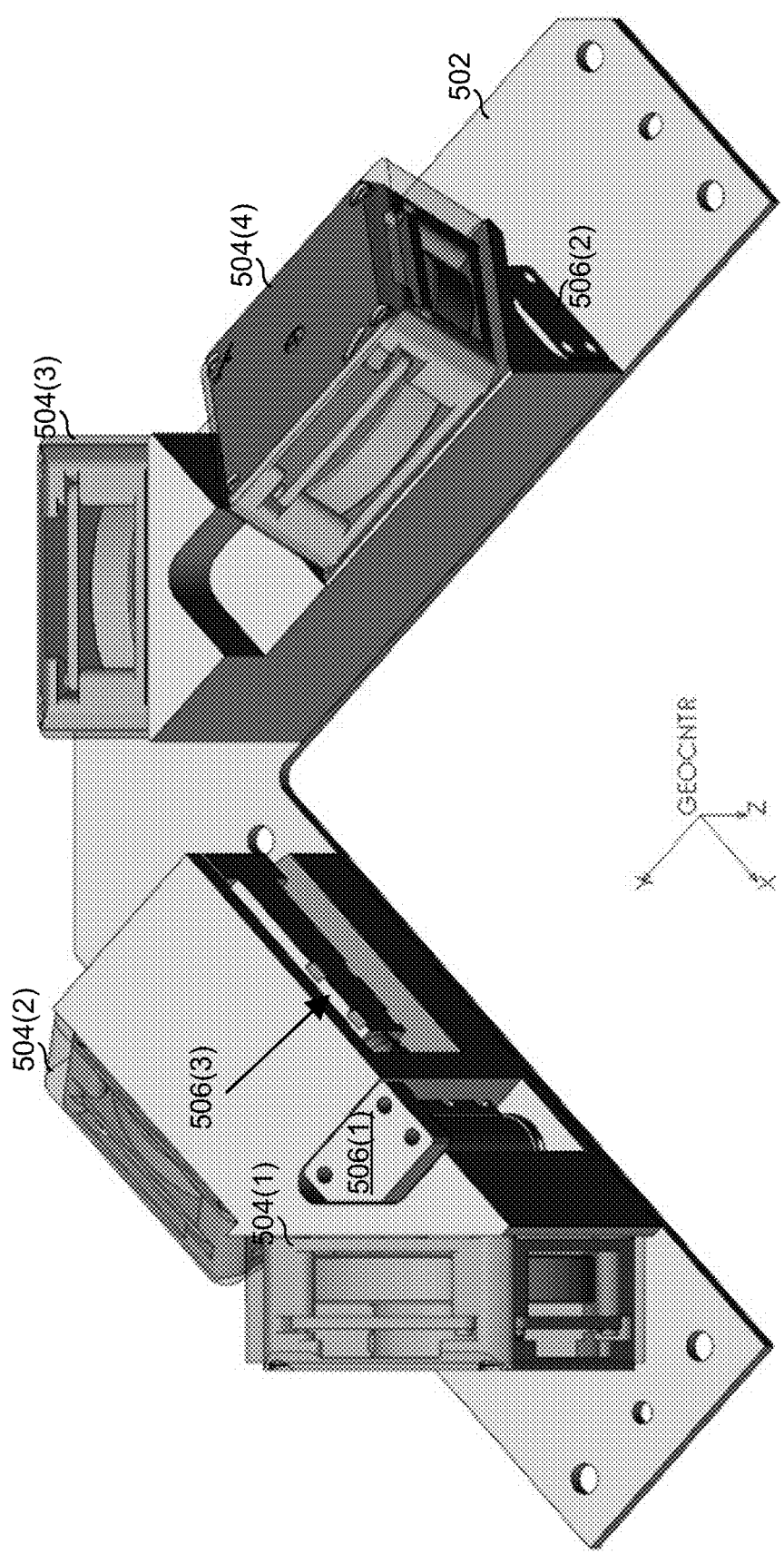
FIG. 5 is an illustration of a rotation control assembly.

FIG. 5 is an illustration of a rotation control assembly 502 including reaction wheels 504(1)-(4) and torque rods 506(1)-(3). In operation, the reaction wheels may be used for rotational control of the satellite. Because of their orientation, slowing down and speeding up the reaction wheels can impart a torque about the center of mass of the satellite. By slowing down (or speeding up) followed by speeding up (or slowing down), the reaction wheels can cause the satellite to start rotating, rotate to a position and stop at that position. A processor can compute the speed changes needed on each of the reaction wheels to maintain a "stare mode" view of a fixed point on the Earth even as the satellite moves along its orbit, thus allowing the collection of large amounts of light from a source. The torque rods can all be identical, but do not need to be. The three torque rods can be mutually orthogonal, but in some implementations, there could be more than three, for redundancy and/or additional torque.

The reaction wheels might hit a point of saturation. The three orthogonal torque rods can add torque as they pass through the Earth's magnetic field to help with desaturation. The torque rods and reaction wheels are mounted on an integrated rotation control assembly, leading to a more compact design.

Figure 6:
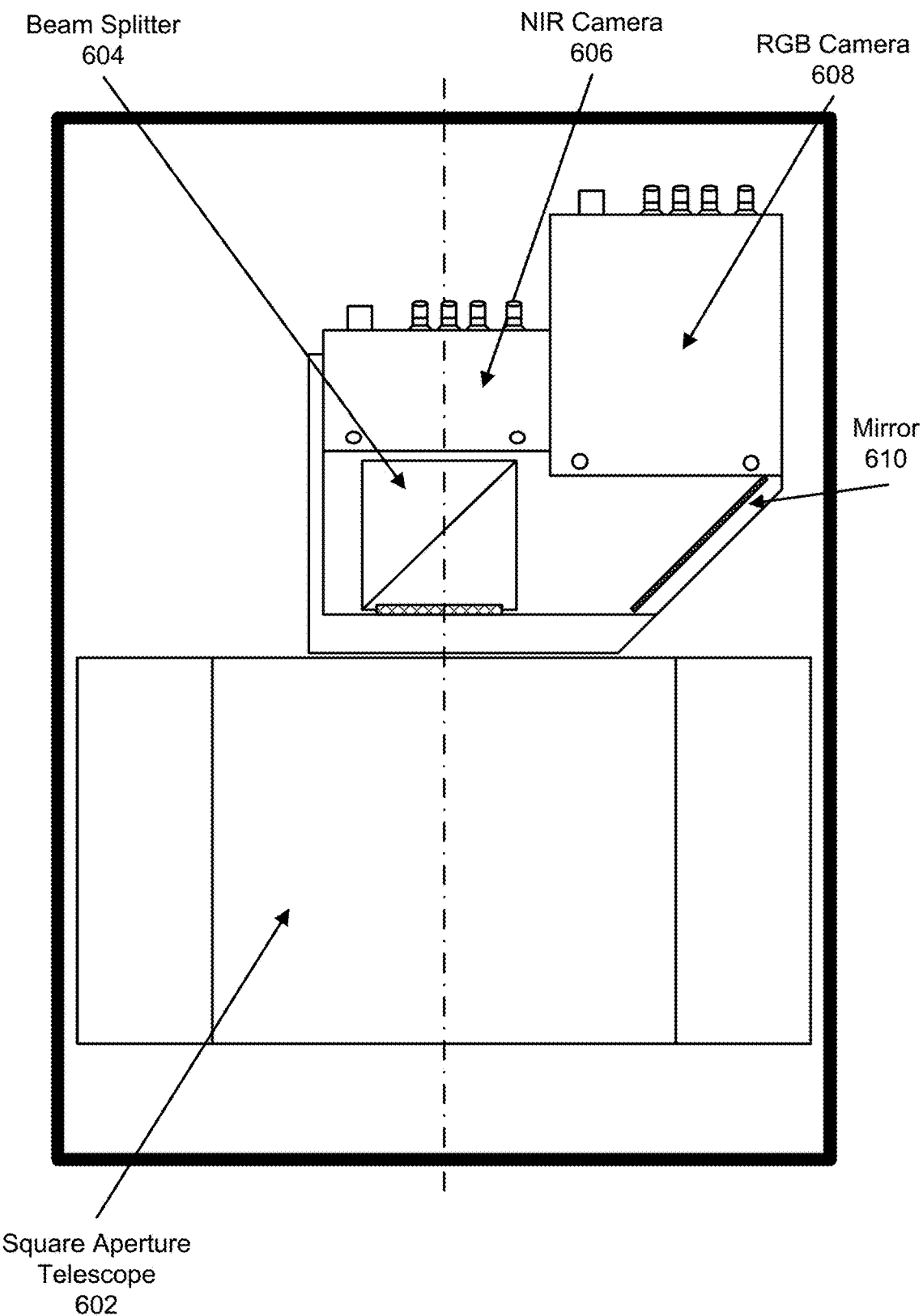
FIG. 6 is an illustration of an example imaging system with arrangement of multiple cameras and a square aperture telescope section.

FIG. 6 is an illustration of an example dual-camera imaging system with arrangement of multiple cameras and a square aperture telescope section. The imaging system includes a square aperture telescope section 602, a beam splitter 604, a mirror 610, a first camera 608 and a second camera 606.

Figure 7:
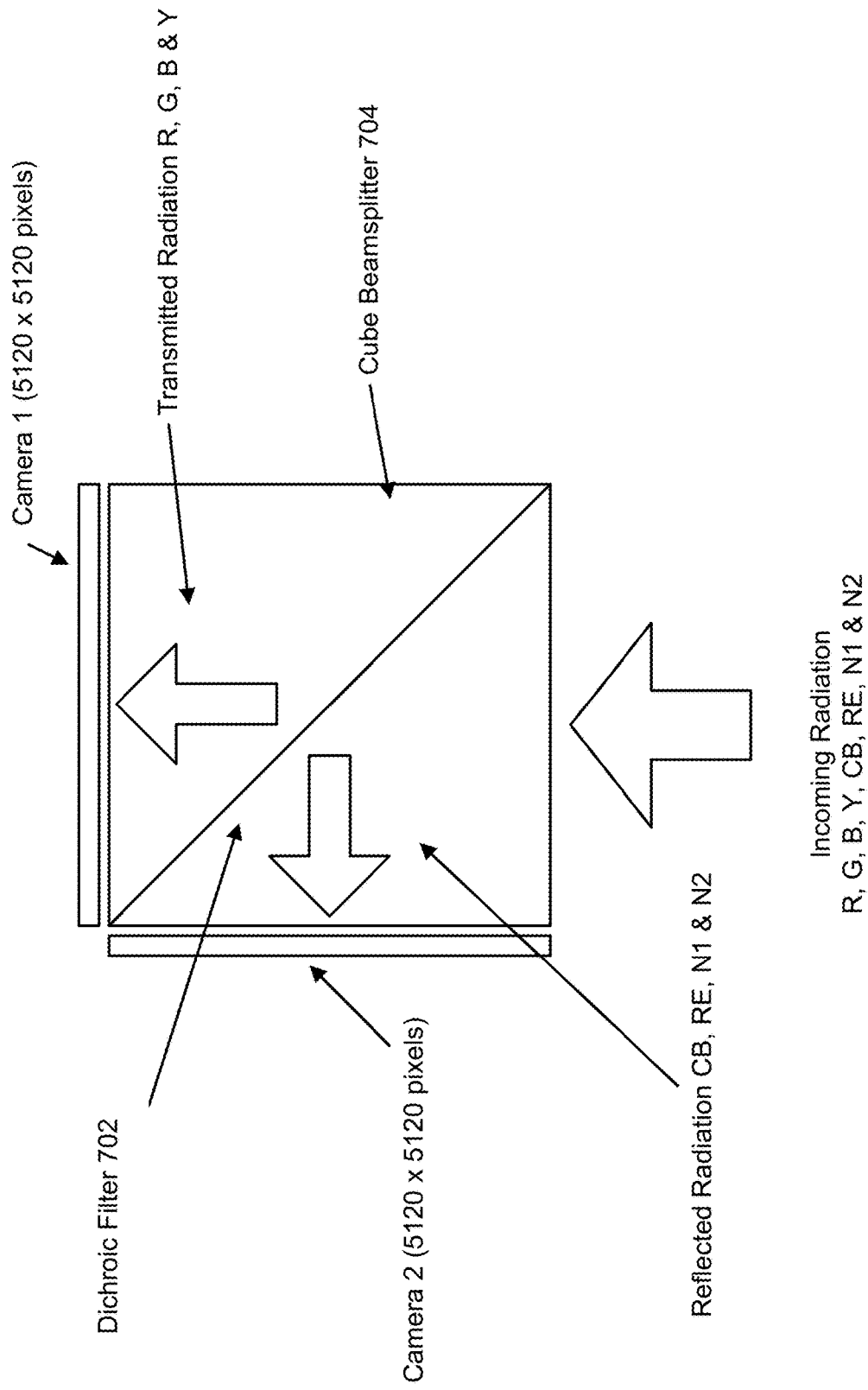
FIG. 7 is a schematic illustration of light paths of the imaging system of FIG. 6.

FIG. 7 is a schematic illustration of light paths of the imaging system of FIG. 6.

Figure 8:
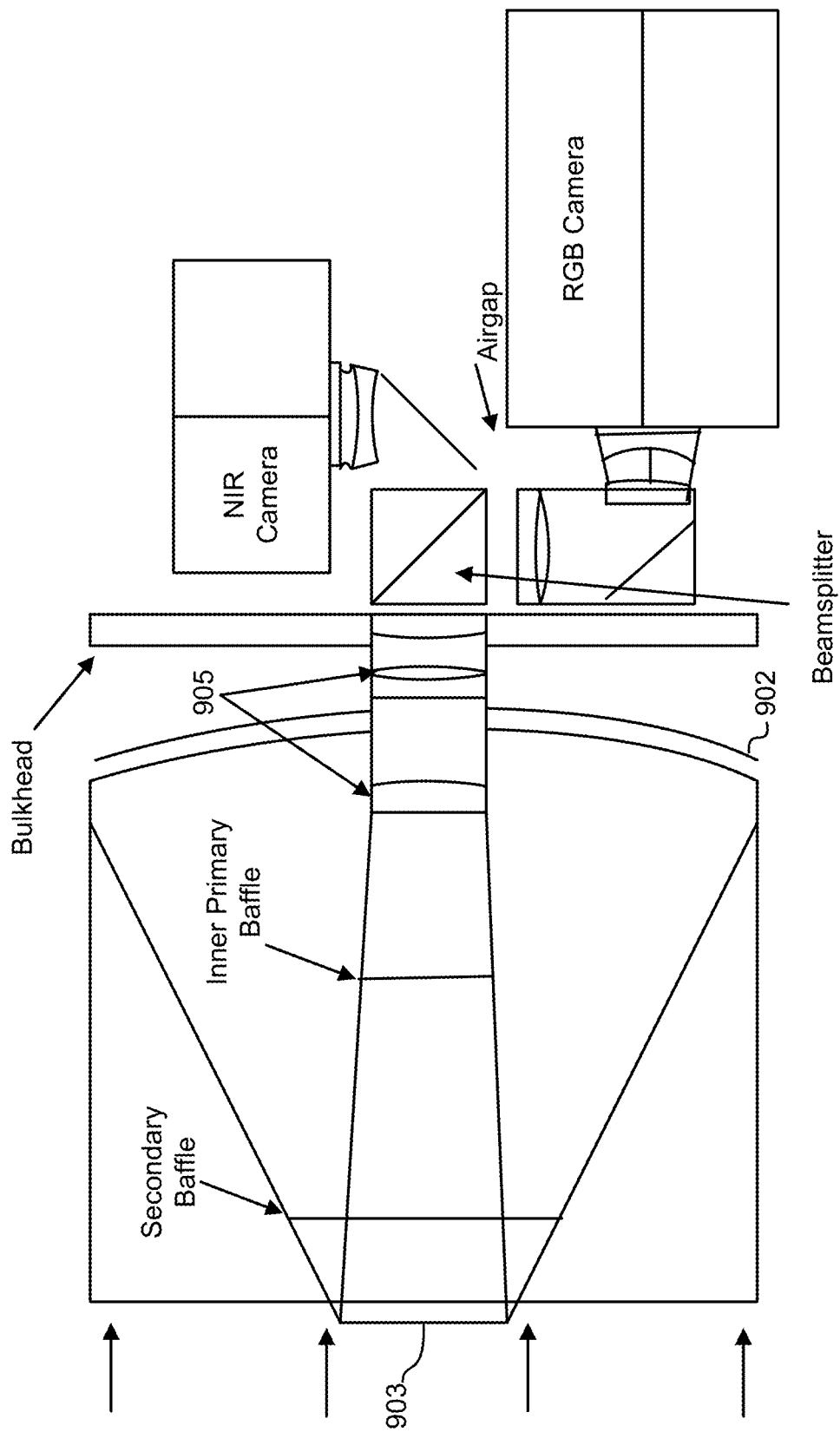
FIG. 8 is a top, cross-sectional view of components of the imaging system of FIG. 6.

FIG. 8 is a top, cross-sectional view of components of the imaging system of FIG. 6, including a primary reflector 902, a secondary reflector 903, and a set of lenses 905.

Figure 9:
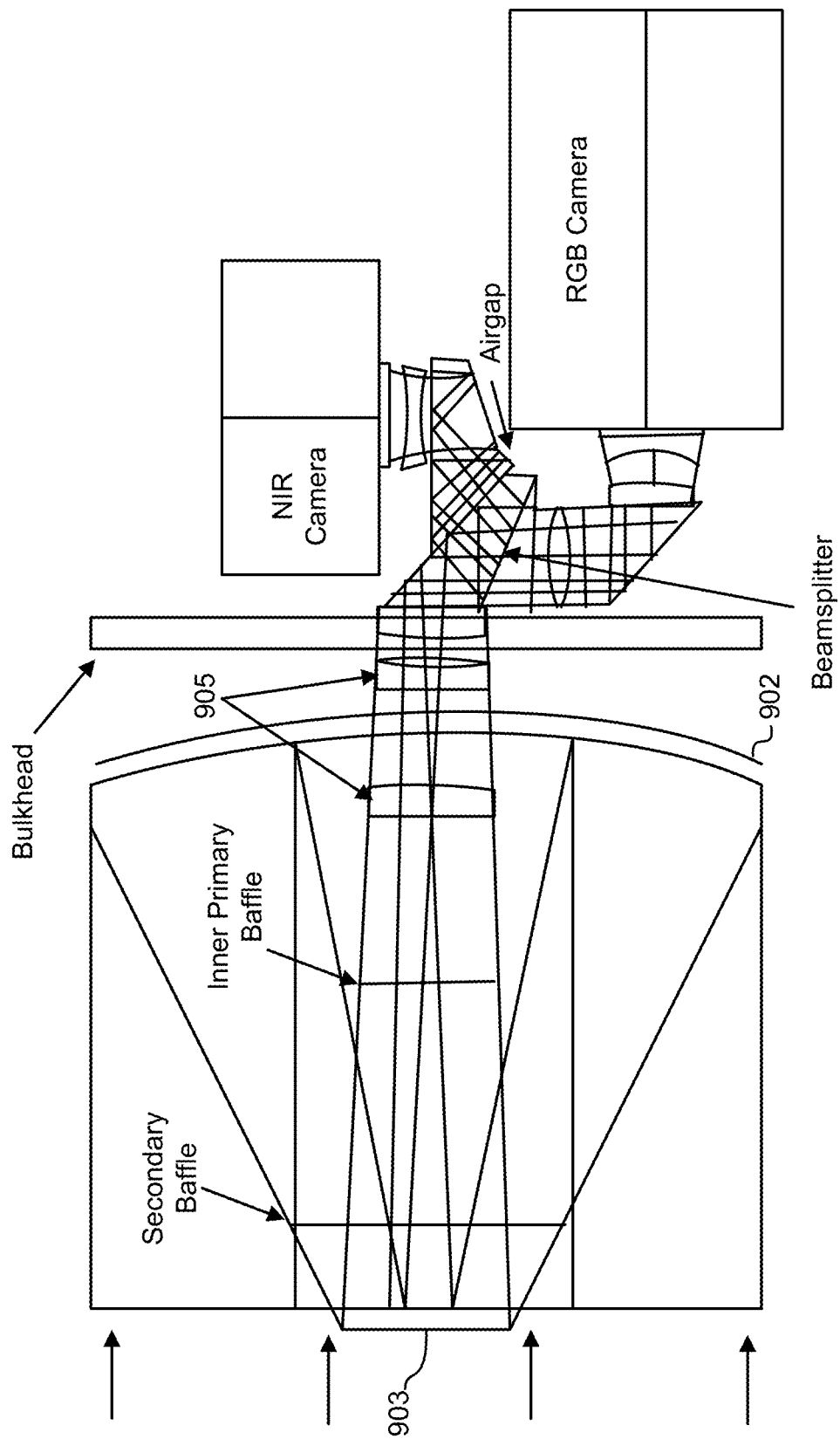
FIG. 9 is a top, cross-sectional view of components of the imaging system of FIG. 6, illustrating light paths.

FIG. 9 is a top, cross-sectional view of components of the imaging system of FIG. 6, illustrating light paths.

In the example here, the sensor array includes two separate cameras. After the lens, the optical path includes a dichroic splitter to separate out different frequency ranges used by the sensor arrays after filtering of wavelengths by the Color Filter Arrays (CFAs) for two cameras, which in this example has one camera for the standard visible spectrum that uses an RGBY colorspace sensor array and another camera for frequencies on either or both sides of the visible, such as bands known as Coastal Blue (near UV), Red Edge, and near infrared (NIR). More generally, other sensor arrays can be used, with sensitivity to bands well beyond those discussed here; and, more cameras with different filter and sensor arrays, or a single camera with a different filter and sensor array can be used after lenses 905.

The performance demands of this design make it sensitive to thermal variations. Accordingly, the structural materials and lens arrangement should be carefully selected to compensate for the temperature range expected in a wide range of orbits. This so-called athermal design provides for consistent imaging performance and also makes it possible to use a wide number of launch opportunities, even if the initial orbit altitude of some launches is above the nominal operating altitude of the telescope design. Good imaging will still be possible, and the spacecraft propulsion system will lower altitude to improve the GSD of the imager.

Figure 10A:
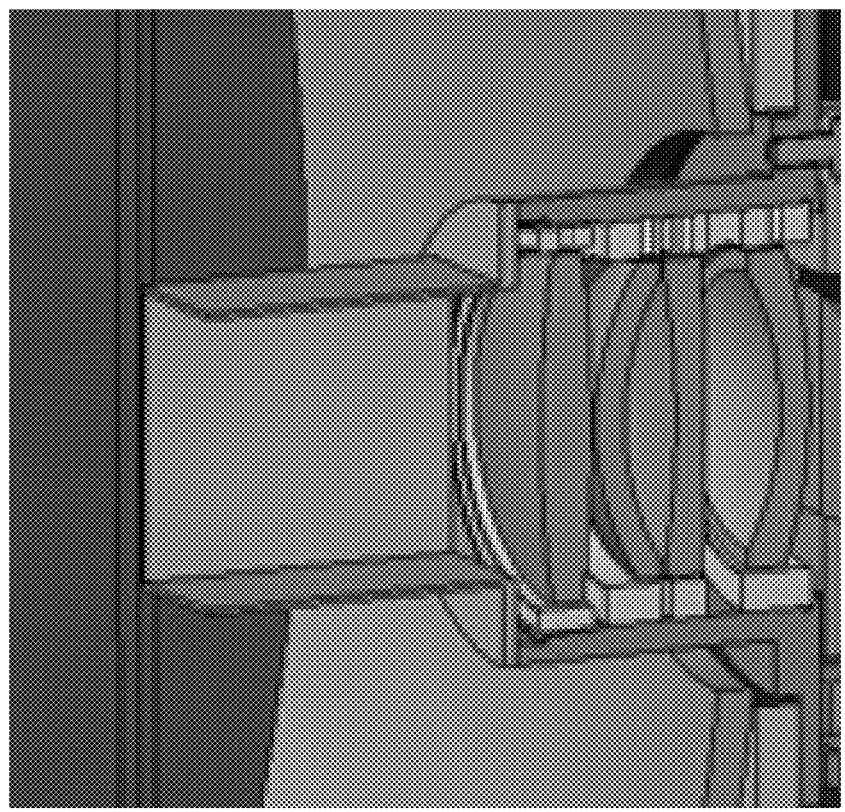
FIG. 10($a$) is an angled view of an optical barrel section.
Figure 10B:
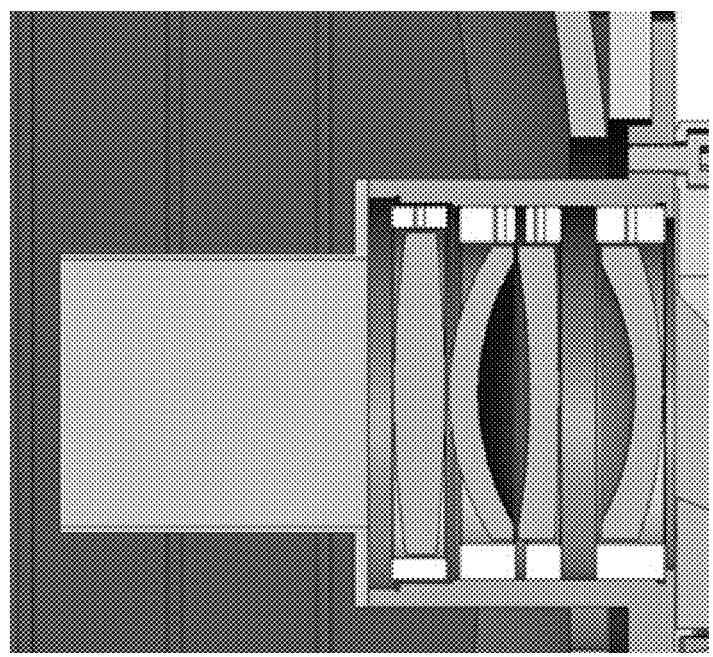

FIG. 10 is a cut-away view of an optical barrel section; FIG. 10(a) is an angled view; FIG. 10(b) is a straight-on side view of the same cut-away.

Figure 11:
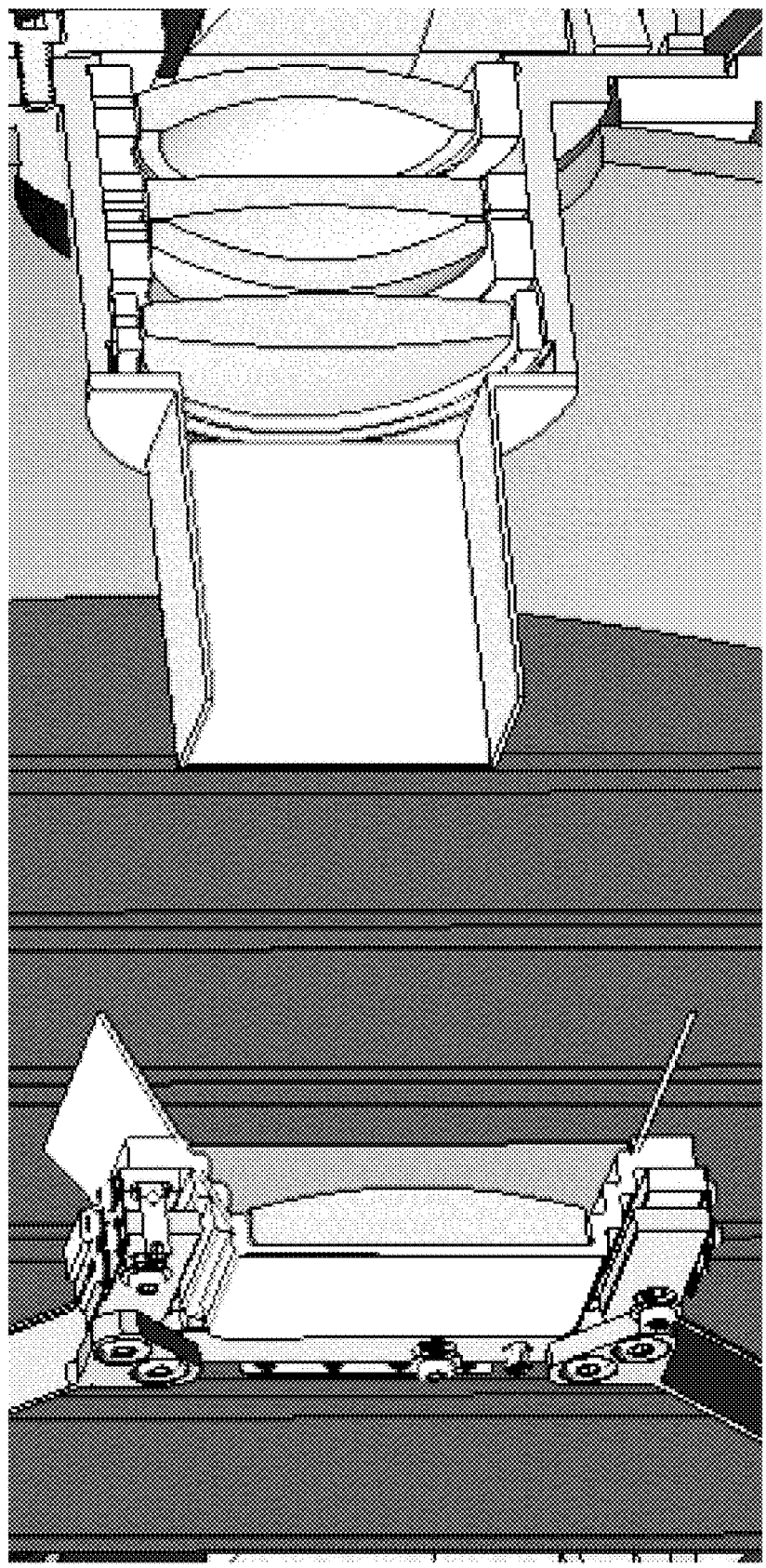
FIG. 11 is a cut-away view of a telescope section showing a square secondary mirror baffle and an optical barrel section.

FIG. 11 is a cut-away view of a telescope section showing a square secondary mirror baffle and an optical barrel section. This shows the relative positioning of a square secondary mirror baffle relative to square internal baffle.

FIG. 12 illustrates one example of a correspondence between the two cameras and the wavelengths to which their sensor arrays respond. At the left of the figure, eight color bands and their corresponding wavelength ranges are listed. The array for the first camera is for the visual range using the RGBY (red, green, blue, yellow) colorspace. The second camera is sensitive to Coastal Blue (CB) with a wavelength below the visible range and Red Edge (RE), Near Infrared 1 (N1) and Near Infrared 2 (N2) at wavelengths above the visible range.

The ability to provide high quality images is improved by mechanically stabilizing the imaging system, both as this improves the images from the individual cameras and makes combining the images from the different cameras of a multi-camera system easier. A terrestrial imaging system can be mounted to an object for steadying, but for a satellite operating in a weightless environment, the situation is more complicated. Although the following is presented in the multi-camera context described above, the issues related to image stability also apply to single camera arrangements.

As noted above, in a diffraction limited (near-optimal) telescope design, the achieved resolution is limited by the pixel density of the sensor array used by the camera, with this resolution being further diluted when a filter array is used to divide the spectrum of light into multiple wavelength bands distributed to a pattern of pixels. One way to improve the effective density of the sensor pixel array is through use of a motor mechanism that can move the sensor array by some subpixel distance, so that the sensor captures multiple images, effectively providing images at subpixel resolution.

For example, the motor mechanism might move the sensor array one half of a pixel width left/right and/or one half of a pixel width up/down, resulting in four different positions. In another example, the motor mechanism moves one third of a pixel width up, one third of a pixel width down, one third of a pixel left, one third of a pixel right, and four combinations of those (e.g., (0, 0), (0, ⅓), (0, ⅔), (⅓, 0), (⅓, ⅓), (⅓, ⅔), (⅔, 0), (⅔, ⅓), (⅔, ⅔)), resulting in nine different positions. This provides a sensor array with the equivalent of four or nine times the number of pixels by combining the shifted images. However, this requires moving mass around, which, when mounted terrestrially or in a much larger satellite might not be much of a problem. In the weightless environment of an orbiting satellite, however, the rapid movement of even a relatively small mass can shift the rest of the satellite, including the telescope portion, over the time period when portions of an individual image are captured via multiple sub-images to be combined. Consequently, the issue of image stability is further complicated when such a pixel shifting mechanism is used in an orbital camera.

Figure 14:
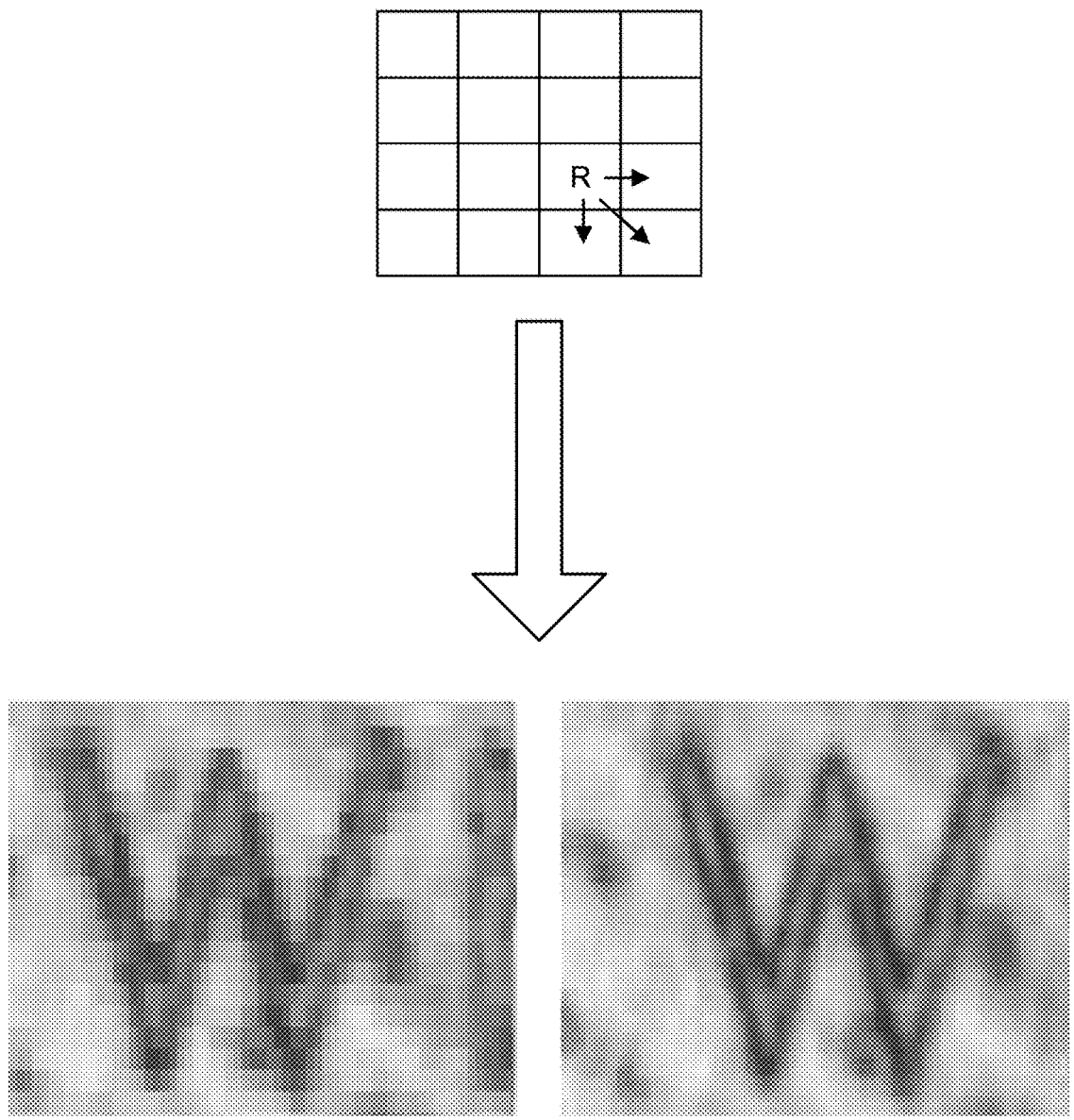
FIG. 14 illustrates an example of increased resolution from the use of subpixel shifting.

The improved sampling resolution (de-aliased image), made possible by pixel shifting is illustrated with respect to an RGBY colorspace sensor array in FIG. 14.

This is effective in part because the area between CMOS pixels, for example, is not all light-sensitive area. Accordingly, shifting pixels into these blank spaces, and into adjacent pixel spaces, can allow the collection of additional information. As discussed with respect to FIG. 13, each of the four colors is represented in one fourth of the array's pixels. By shifting the array, as illustrated for the red pixel, to one of each of the other three positions, the effective number of pixels is quadrupled, so that a 25-megapixel (MP) array provides the resolution of a 100 MP array. Similarly, a 3×3 sub-pixel shifting would allow a 25-megapixel (MP) array to provide the resolution of a 225 MP array. As shown in FIG. 6 and other figures, the visual spectrum camera is represented as larger than the extended spectrum camera to allow incorporation of the pixel shifting mechanism for higher resolution of the visible image.

To address overall stabilization requirement, the satellite can incorporate a number of design elements that can provide the stable result required for good imaging. These design elements can allow the satellite to point at a target for longer periods, which provides benefits to both signal-to-noise (SNR) and apparent image resolution through use of a pixel shifting super-resolution technique. Stabilization can be enabled by a combination of high performance, 3-axis attitude determination and control system (ADCS), which is optimized to reduce disturbances and errors imparted to the image pointing function, design features that reduce the amount of time during which the imager should be stable.

In addition, modifications to the programmed motion of the pixel shifter can be made to compensate for the disturbance caused by the pixel shifter itself. Here, the torque applied to the spacecraft by the pixel shift causes slight movement of the telescope pointing that are predictable and correctable using fine adjustments or profiled smoothing of the commanded pixel shifting motion. Other improvements include use of a second pixel shifting mechanism with the same mass and motion performance, rotated 180 degrees, such that it can cancel or modify the disturbances caused by the first pixel shifting mechanism. Either, or both of these mechanisms may also be used in combination with disturbance sensors and software to cancel out any predictable disturbances from other sources.

In some embodiments, the countering mass that counters the movement of a pixel sensor array by subpixel distances might be the other pixel array in another camera. The movement can be timed appropriately if both sensor arrays are being used at the same time. However, in the case where only one of the pixel arrays employ subpixel shifting, other masses could be used. The mass might be equal to the mass of the moving sensor array, with both having the same distance from the center of mass of the satellite. However, that is not required, as software can be used to adjust between the movements of masses at different distances, to adjust for equal moment of inertia.

In one example, the spacing between pixels is around 4.5 microns, so a movement of a third of a pixel is 1.5 microns. Movements as fine as 1 micron, or finer, might be used. The sensor array might be moved using semiconductor elements that expand/contract upon the application of electrical potential. Piezoelectric elements might provide such movement in the ranges of microns. A processor, on board or ground-based, could process images to determine how much movement is occurring, allowing for calibration of the movement mechanism.

With respect to the attitude determination and control system (ADCS), the satellite can apply an inertial measurement unit with a very precise 3-axis rate sensor and use ultra-smooth bearings in the reaction wheels to cancel angular motion. It can also point a star tracker at such an angle as to provide a stable external reference and ensure optimum pointing accuracy when included in the control system's Kalman filtering algorithm. The attitude control system operates at a high sampling rate to limit the effect of signal quantization, and sensor noise is suppressed. Gains applied to the control algorithm are modified using a control-mode dependent gain schedule to ensure low jitter amplitudes during pixel-shifted imaging periods. Damping devices and vibration isolators can be added to reduce and isolate the effects of vibration, keeping them away from the telescope's pointing behavior. A notch filter algorithm can be applied to suppress the control system from responding to or exciting resonant modes in the satellite structure or vibration isolation devices, thereby suppressing instabilities. Additionally, the satellite can include a processor or processing system that includes program code that includes and executes a set of program steps to ensure that reaction wheels operate at mean rates that impart minimum resonant excitation to the satellite and control system.

The reaction wheels can be balanced in advance using laser ablation. When the reaction wheels are more balanced, that reduces the vibrations that spinning reaction wheels impart to the satellite and therefore to the imaging systems, telescope orientation, etc. In this approach, imbalances are measured, perhaps by lasers or other methods, and then portions of the reaction wheels are ablated by a laser to bring the reaction wheels more into balance.

The satellite can also reduce imaging sensitivity to angular rates by shortening the time period during which stable pointing must be maintained. This can be done by use of the highest available data rate for sensor readout in a pixel shifting camera, so that a high-rate data readout and recording system can be used to collect multiple images within a shortened time period to limit the effect of vibration upon image quality. Here, it should be noted that sensor readout time may be the dominant factor in the sum of things that add to the pixel shifting time period. To reduce readout time, cameras can use multiple high rate output channels to provide an image readout rate that halves the time period during which the multiple pixel shifted images are collected and transferred to storage. Further, the use of buffer memories installed in the camera electronics can shorten the readout time requirement. The resulting shortened time period means that the imaging system is less affected by angular rate effects since the area imaged remains acceptably stable during the shortened period of imaging.

In the pixel shifting case, the movement can also be counter-balanced to add to stability. For example, a mechanism similar to the pixel shifter, but with equal and opposite motion can be added to counteract the force imparted by the pixel shifting mechanism. The image can also be stabilized by coordinating the operation of the satellite's thrusters with the camera operation. When a request for the satellite to capture an image is received or scheduled, the status of the satellites thrusters is checked. If the requested imaging requires that the thrusters be stopped, this can be done. It may be the case that the satellite needs to allow the thrusters to operate while imaging takes place. Accordingly, thrusters would need to operate with very low thrust disturbance. More importantly, the satellite should have an attitude control system capable of providing suppression of angular rates sufficient to enable imaging while thrusters are operating. Then, to enable the imaging function to proceed, it evaluates a three-axis angular rate sensor to see that rates are low enough for imaging events to proceed. Here, there are at least two levels of angular rate fidelity of concern: 1) an angular rate low enough to eliminate "pixel smear" for routine single-frame imaging, and 2) a lower angular rate to ensure that pixel shifted imaging can be effectively performed. Additionally, for extreme stability in all pointing modes, active damping motion compensation can be added as previously described.

According to one embodiment, the techniques described herein are implemented by one or more generalized computing systems programmed to perform the techniques pursuant to program instructions in firmware, memory, other storage, or a combination. Although not shown, processing might be performed by a processor that accesses instructions in a program memory and controls communication and processing information. A processing system might include random access memory (RAM) or other dynamic storage device, or other intermediate information during execution of instructions to be executed by the processor. Such instructions, when stored in non-transitory storage media accessible to the processor, render the processing system into a special-purpose machine that is customized to perform the operations specified in the instructions. The processing system might also include a read only memory (ROM) or other static storage device for storing static information and instructions for the processor. The processing system may implement the techniques described herein using customized hard-wired logic, one or more ASICs or FPGAs, firmware and/or program logic which causes or programs the processing system to be a special-purpose machine. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Storage media is distinct from but may be used in conjunction with transmission media. Transmission media participates in transferring information between storage media. For example, transmission media includes coaxial cables, copper wire and fiber optics, including the wires that comprise a processor bus. Transmission media can also take the form of radio waves or light waves. Communication can be two-way data communication coupling to a ground station or another satellite.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A satellite imaging system, mounted on or within a satellite adapted for use in orbit, for capturing images to be taken from the orbit, the satellite imaging system comprising:
   a telescope section arranged to receive incoming light;
   a lens system, comprising at least one lens positioned in an optical path;
   a camera having a sensor array that shifts in a perpendicular shift relative to an optical axis of the optical path while capturing an image to be captured to improve the resolution thereof; and
   an attitude determination and control system, whereby the the attitude determination and control system stabilizes the satellite while capturing the image to be captured, in part by counteracting movement of the satellite that is caused by, or is predicted to be caused by, the perpendicular shift of the sensor array.

2. The satellite imaging system of claim 1, further comprising:
   an active disturbance cancellation system, whereby a combination of mechanisms, sensors, and computer algorithms reduce the effect of disturbances while capturing the image to be captured; and
   a high-rate data readout and recording system, whereby multiple images can be collected within a shortened time period to limit the effect of vibration upon image quality.

3. The satellite imaging system of claim 1, further comprising:
   a pixel shifting mechanism capable of shifting the sensor array relative to the optical path; and
   an image capture system coupled to the sensor array to read sensor readings and record pixel light readings, wherein the pixel light readings correspond to the image being captured,
   wherein the sensor array comprises pixel sensors that can sense light energy impinging on pixels of the sensor array, and wherein the sensor array is positioned to receive the light energy from the optical path after the light energy has passed, at least in part, through the lens system.

4. The satellite imaging system of claim 3, further comprising:
   an attitude determination and control system that counteracts movement of the satellite that is caused by, or is predicted to be caused by, movement of the sensor array and/or operation of the pixel shifting mechanism.

5. The satellite imaging system of claim 4, wherein the attitude determination and control stabilizes the satellite for a duration of an exposure time of the image being captured.

6. The satellite imaging system of claim 3, wherein the pixel shifting mechanism comprises a motor mechanism that can move the sensor array one half of a pixel width left/right and/or one half of a pixel width up/down.

7. The satellite imaging system of claim 3, wherein the pixel shifting mechanism comprises a motor mechanism that can move the sensor array one third of a pixel width up, one third of a pixel width down, one third of a pixel width to the left, one third of a pixel width to the right, and combinations of those movements.

8. The satellite imaging system of claim 3, wherein the pixel shifting mechanism comprises semiconductor elements that expand/contract upon application of an electrical potential.

9. The satellite imaging system of claim 8, wherein the pixel shifting mechanism comprises piezoelectric elements that provide movement of around a few microns.

10. The satellite imaging system of claim 1, wherein the image being captured has a resolution higher than that of the sensor array as a result of a combination of sensor readings read from a plurality of positions of the sensor array in the optical path, wherein the plurality of positions comprise subpixel shifting.

11. The satellite imaging system of claim 1, wherein the sensor array comprises individual pixel sensors formed of a charge coupled device (CCD) or of a complementary metal-oxide semiconductor (CMOS) sensor, in a square two-dimensional array.

12. The satellite imaging system of claim 11, wherein the square two-dimensional array comprises a pattern of pixels sensitive to different colors.

13. The satellite imaging system of claim 12, wherein the different colors are a red color range, a green color range, and a blue color range, with a ratio of approximately half green, one quarter red, and one quarter blue.

14. The satellite imaging system of claim 1, further comprising a pixel shifting mechanism capable of shifting the sensor array relative to the optical path, wherein the pixel shifting mechanism comprises a plurality of plates configured to move such that a center of mass of the plurality of plates is substantially stationary while the plurality of plates moves relative to the optical path.

15. The satellite imaging system of claim 14, wherein the plurality of plates comprises two plates, each having mounted thereon a portion of the sensor array.

16. The satellite imaging system of claim 14, wherein one plate of the plurality of plates has mounted thereon all sensors of the sensor array.

17. The satellite imaging system of claim 1 wherein the attitude determination and control system comprises a plurality of reaction wheels and/or a plurality of torque rods to provide for rotational control of the satellite, thereby imparting a torque about a center of mass of the satellite and/or causing the satellite to start rotating, rotate to a position and stop at that position to allow for the optical path to remain pointed at a fixed point on Earth even as the satellite moves along its orbit.

* * * * *